United States Patent [19]

Huang

[11] Patent Number: 5,700,956
[45] Date of Patent: Dec. 23, 1997

[54] SIGNAL GENERATING PRESSURE GAUGE

[76] Inventor: Tien-Tsai Huang, No. 4, Lane 30, Wu-Chuan St., Pan-Chiao City, Taipei Hsien, Taiwan

[21] Appl. No.: 747,931

[22] Filed: Nov. 12, 1996

[51] Int. Cl.$^6$ .................... G01L 9/10; G08B 21/00; H01H 35/36
[52] U.S. Cl. .................... 73/735; 200/81.8; 340/626
[58] Field of Search .................... 73/733, 735, 743; 340/626, 688; 200/81.8

[56] References Cited

U.S. PATENT DOCUMENTS

| | | | |
|---|---|---|---|
| 2,050,629 | 8/1936 | Quereau et al. | 73/735 |
| 2,835,130 | 5/1958 | Kachline | 73/733 |
| 3,678,758 | 7/1972 | Lawrence | 73/733 |
| 4,502,334 | 3/1985 | Gorgens et al. | 73/733 |

*Primary Examiner*—George M. Dombroske
*Assistant Examiner*—William L. Oen
*Attorney, Agent, or Firm*—Oblon, Spivak, McClelland, Maier & Neustadt, P.C.

[57] ABSTRACT

A signal generating pressure gauge includes a pressure indicating unit having a housing provided with an inlet, a pressure-value indicating panel, a pressure converting unit fluidly communicated with the inlet and provided with a rotary shaft which rotates in response to pressure entering into the inlet, a pointer which rotates with the rotary shaft in order to indicate on the indicating panel the pressure imposed on the inlet, and an electrically conductive pressure control needle movable together with the pointer. An adjustable pressure-setting mechanism includes a rotary plate rotatably mounted in the housing and rotatable relative to the indicating panel, and electrically conductive low-pressure and high-pressure stop units which extend into a setting hole unit in the rotary plate. The positions of the low-pressure and high-pressure stop units in the setting hole unit are adjustable and correspond to the lower and upper limits of a desired pressure range. The stop units limit movement of the pressure control needle therebetween. A signal transmitting unit includes an input voltage cable electrically coupled to the pressure control needle, and low-pressure and high-pressure output signal cables coupled electrically and respectively to the low-pressure and high-pressure stop units.

6 Claims, 4 Drawing Sheets

SIGNAL GENERATING PRESSURE GAUGE

BACKGROUND OF THE INVENTION

1. Field of the Invention

The invention relates to a pressure gauge, more particularly to a pressure gauge which is capable of generating an electrical signal upon detecting that the measured pressure value has reached an upper or lower limit of a predetermined pressure range.

2. Description of the Related Art

Referring to FIG. 1, a conventional pressure gauge 10, which is capable of generating an electrical signal upon detecting that a measured fluid pressure has reached an upper or lower limit of a predetermined pressure range, comprises a housing provided with an inlet 12 to be connected to an article (not shown) whose pressure value is to be measured, a pressure-value indicating panel 13 disposed in the housing, a pressure converting unit (not shown) disposed in the housing behind the indicating panel 13 and fluidly communicated with the inlet 12, an electrically conductive pointer 14 disposed in the housing in front of the indicating panel 13 and operatively associated with the pressure converting unit in order to indicate on the indicating panel 13 the pressure entering into the inlet 12, electrically conductive low-pressure and high-pressure setting needles 16, 18 disposed on the top of the indicating panel 13, an input voltage cable 19, a low-pressure output signal cable 166 electrically coupled to the low-pressure setting needle 16, and a high-pressure output signal cable 186 electrically coupled to the high-pressure setting needle 18.

The pressure converting unit rotates the pointer 14 relative to the indicating panel 13 in response to the pressure imposed on the inlet 12, thereby enabling the pointer 14 to indicate the pressure on the indicating panel 13. Each of the low-pressure and high-pressure setting needles 16, 18 is operatively associated with a respective operating knob 164, 184 for adjusting the position of the corresponding setting needle 16, 18 relative to the indicating panel 13 to adjust, in turn, the lower and upper limits of the desired pressure range. Each of the low-pressure and high-pressure setting needles 16, 18 is further provided with a respective downward extension 162, 182 to facilitate an electrical contact with the pointer 14. The input voltage cable 19 is electrically coupled with the pointer 14 to provide an electrical signal, such as a 5-volt signal, thereto.

In use, when pressure enters into the inlet 12, the pressure converting unit rotates the pointer 14 to indicate the pressure on the indicating panel 13. When the measured pressure value is between the upper and lower limits of the desired pressure range, no electrical signal is present at the output signal cables 166, 186 since the pointer 14 is disposed between the low-pressure and high-pressure setting needles 16, 18 and is not in contact with either of the same. When the measured pressure value corresponds to one of the upper and lower limits of the desired pressure range, the pointer 14 is in electrical contact with the downward extension 162, 182 of the low-pressure or high-pressure setting needle 16, 18 so that the electrical signal present at the pointer 14 can be transmitted to one of the output signal cables 166, 186 via the low-pressure or high-pressure setting needle 16, 18. The electrical signal at the output signal cables 166, 186 can be used to control activation or deactivation of a fluid pump (not shown) so that the pressure of the article being measured can be maintained within the desired pressure range.

It is noted that the low-pressure and high-pressure setting needles 16, 18 have to be independently adjusted when varying the desired pressure range even if the difference between the new upper and lower pressure limits is the same as that between the old upper and lower pressure limits. Independent adjustment of the low-pressure and high-pressure setting needles 16, 18 is inconvenient to conduct and may affect precision of the pressure gauge 10.

SUMMARY OF THE INVENTION

The main object of the present invention is to provide a pressure gauge which is capable of generating an electrical signal upon detecting that the measured pressure value has reached an upper or lower limit of a predetermined pressure range, and which facilitates adjustment of the desired pressure range when the difference between the new upper and lower pressure limits is the same as that between the old upper and lower pressure limits.

Accordingly, the signal generating pressure gauge of the present invention comprises:

- a pressure indicating unit including: a housing provided with an inlet to be connected to an article whose pressure value is to be measured; a pressure-value indicating panel disposed in the housing; a pressure converting unit disposed in the housing behind the indicating panel and fluidly communicated with the inlet, the pressure converting unit having a rotary shaft which extends through the indicating panel and which rotates in response to pressure entering into the inlet; a pointer disposed in the housing in front of the indicating panel and having one end secured to the rotary shaft so as to be rotatable therewith in order to indicate on the indicating panel the pressure imposed on the inlet; and an electrically conductive pressure control needle disposed between the pointer and the indicating panel and having one end rotatably sleeved on the rotary shaft, the pressure control needle being movable together with the pointer;

- an adjustable pressure-setting mechanism including: a rotary plate rotatably mounted in the housing and rotatable relative to the indicating panel, the rotary plate being formed with a setting hole unit; and electrically conductive low-pressure and high-pressure stop units extending into the setting hole unit, positions of the low-pressure and high-pressure stop units in the setting hole unit being adjustable and corresponding to lower and upper limits of a desired pressure range, the stop units limiting movement of the pressure control needle therebetween; and

- a signal transmitting unit including: an input voltage cable electrically coupled to the pressure control needle for providing an electrical signal thereto; a low-pressure output signal cable electrically coupled to the low-pressure stop unit; and a high-pressure output signal cable electrically coupled to the high-pressure stop unit.

The pressure control needle electrically contacts the high-pressure stop unit to transmit the electrical signal to the high-pressure output signal cable when the pressure imposed on the inlet reaches the upper limit of the desired pressure range, and electrically contacts the low-pressure stop unit to transmit the electrical signal to the low-pressure output signal cable when the pressure imposed on the inlet reaches the lower limit of the desired pressure range.

Preferably, the pointer is formed with a downward extension for moving the pressure control needle therewith from the low-pressure stop unit to the high-pressure stop unit. The pressure indicating unit further includes a restoring spring with a first end connected to the housing and a second end connected to the pressure control needle. The restoring spring is wound when the pressure control needle moves with the pointer from the low-pressure stop unit to the high-pressure stop unit and unwinds to bias the pressure control needle toward the downward extension of the pointer when the pointer moves from the high-pressure stop unit to the low-pressure stop unit.

In the disclosed embodiment, the rotary plate has a peripheral edge, at least a portion of which is formed with teeth. The pressure indicating unit further includes a drive shaft which is rotatably mounted to the housing and which is provided with a gear that meshes with the peripheral edge of the rotary plate. The drive shaft has one end which extends out of the housing to permit manual operation of the drive shaft in order to rotate the rotary plate.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 3:
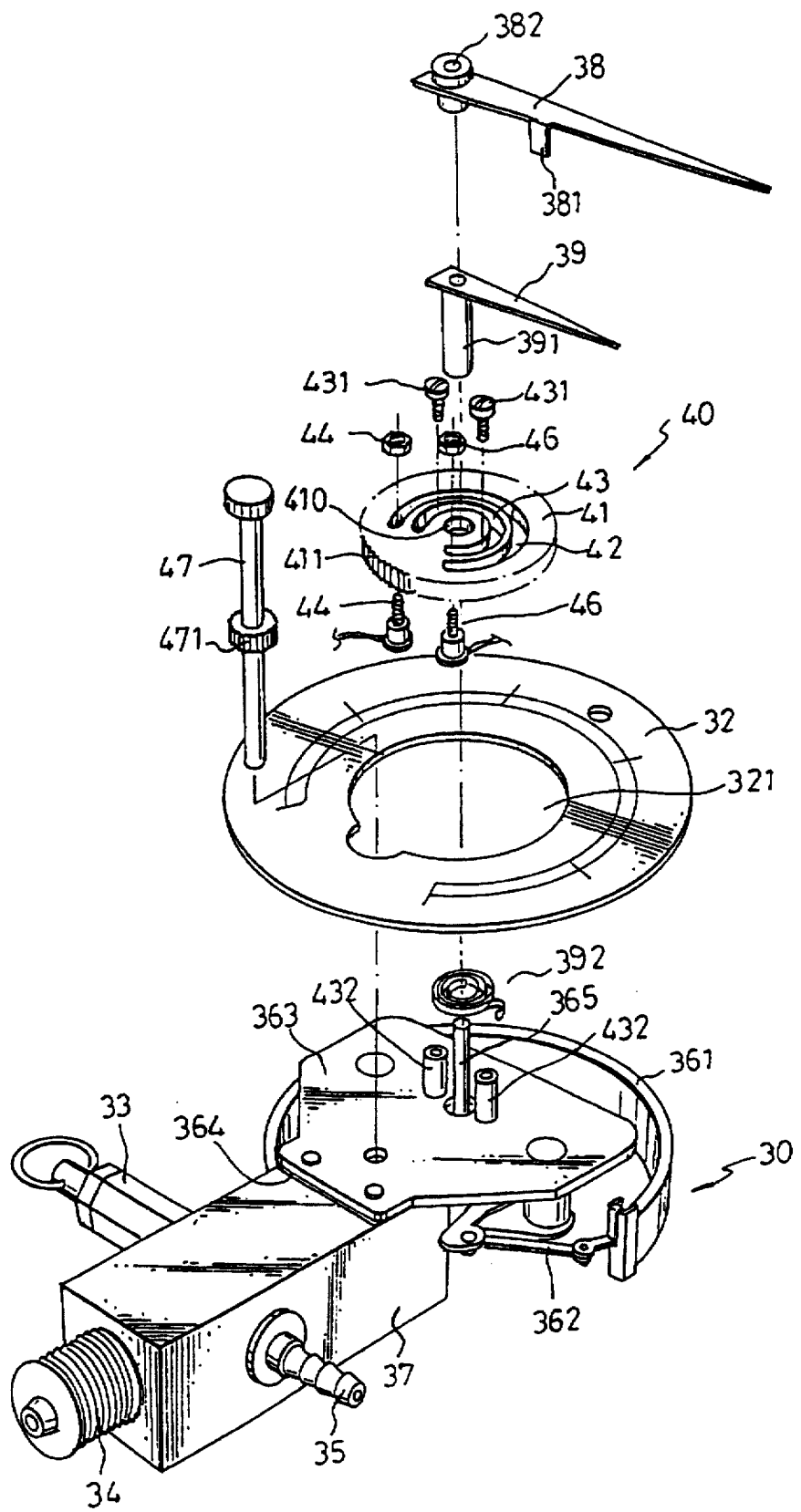
FIG. 3 is a partly exploded view of the preferred embodiment.
Figure 4:
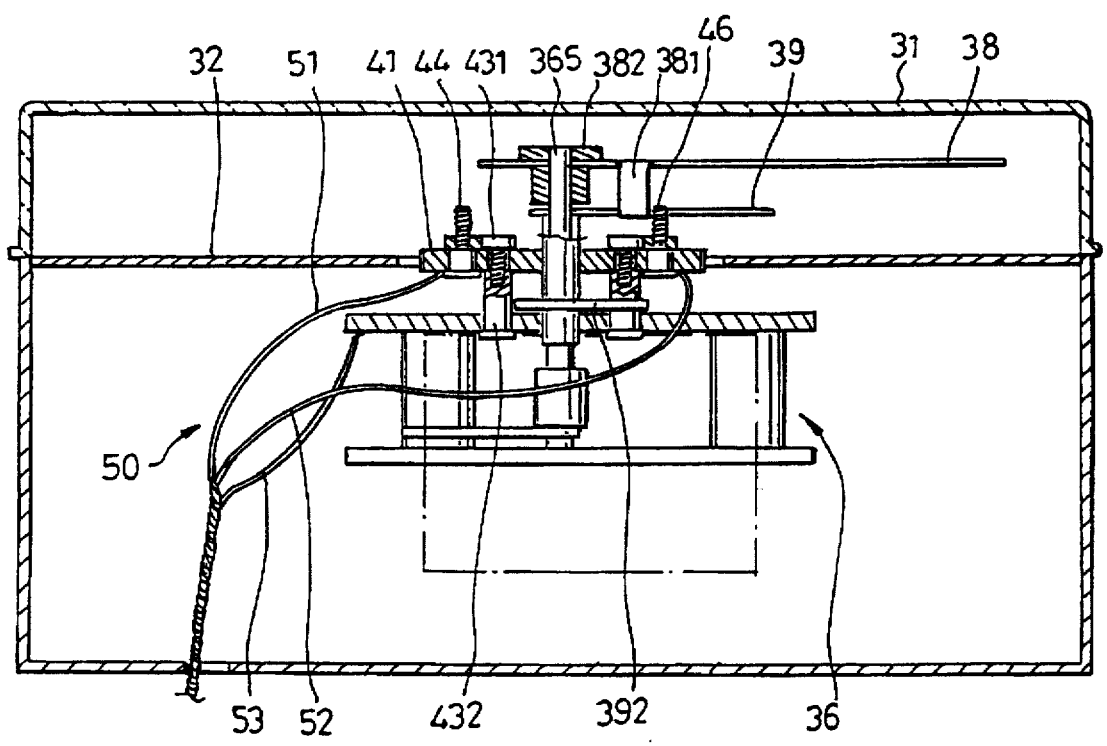
FIG. 4 is a sectional view of the preferred embodiment.
Figure 5:
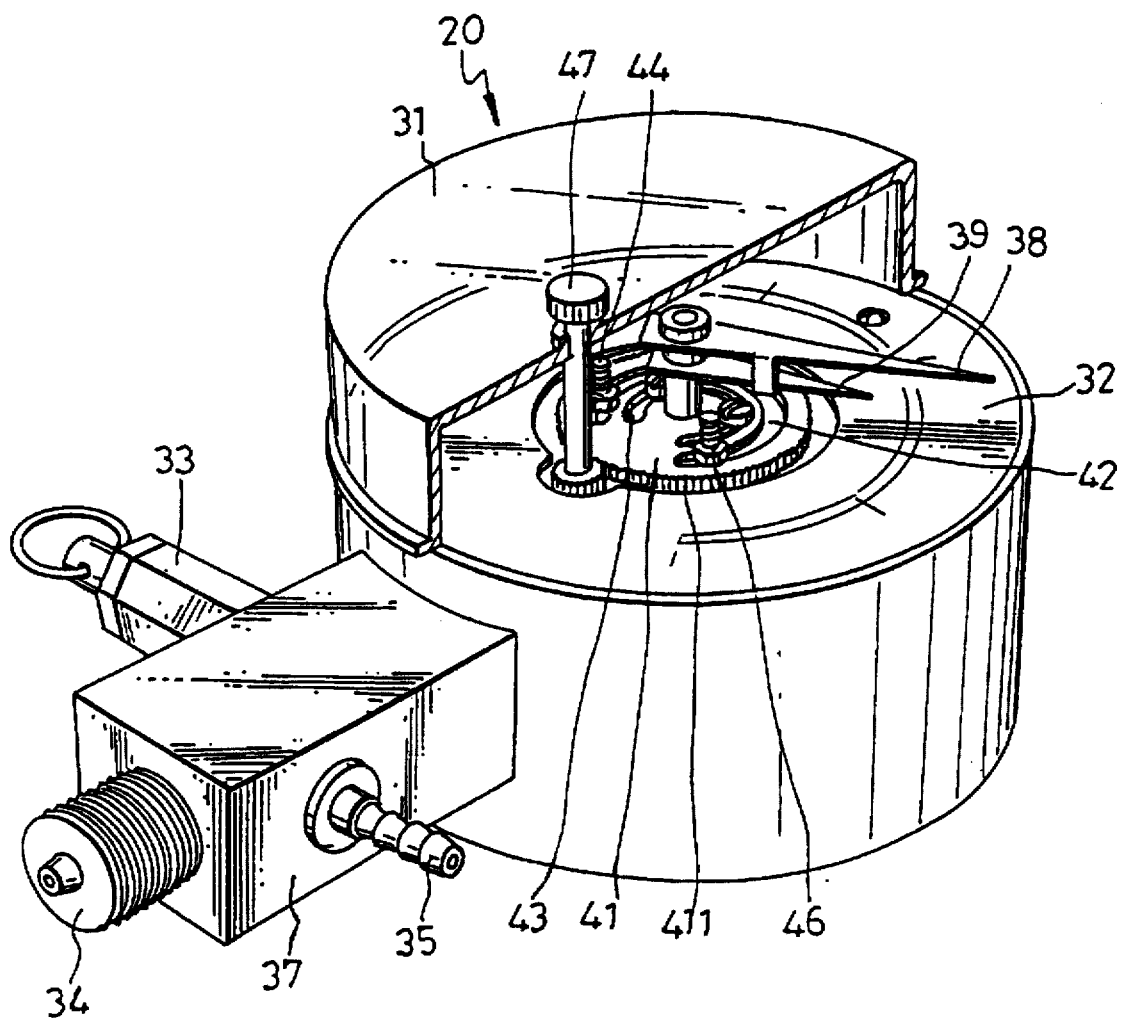
FIG. 5 is a perspective view of the preferred embodiment.

Referring to FIGS. 3 to 5, the preferred embodiment of a signal generating pressure gauge 20 according to the present invention is shown to comprise a pressure indicating unit 30, an adjustable pressure-setting mechanism 40 and a signal transmitting unit 50.

Figure 1:
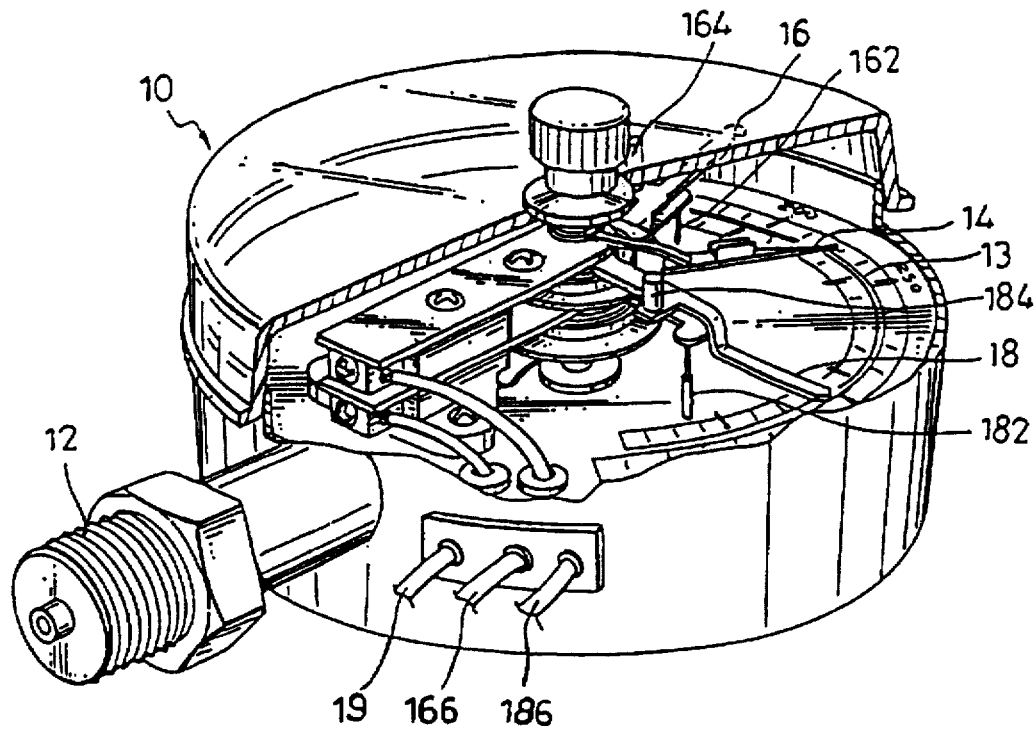
FIG. 1 illustrates a conventional signal generating pressure gauge.
Figure 2:
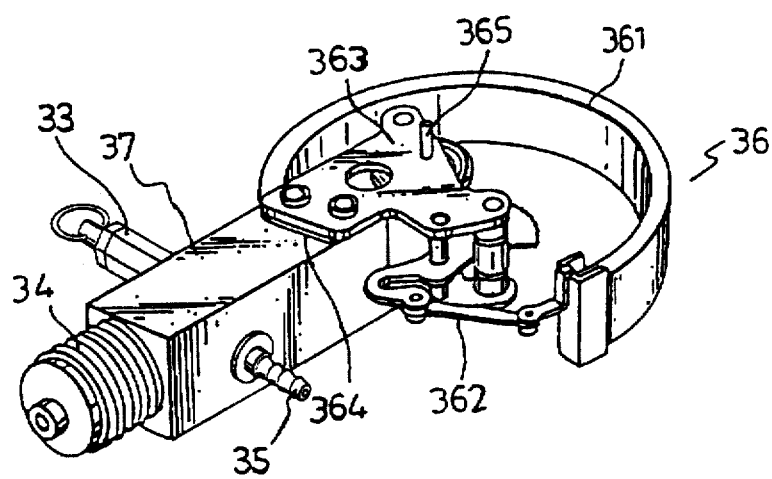
FIG. 2 is a perspective view of a pressure converting unit of the preferred embodiment of a signal generating pressure gauge according to the present invention.

The pressure indicating unit 30 includes a housing 31 provided with an inlet 34 to be connected to an article (not shown) whose pressure value is to be measured, a pressure-value indicating panel 32 disposed in the housing 31 and formed with a central opening 321, a pressure converting unit 36 disposed in the housing 31 behind the indicating panel 32 and fluidly communicated with the inlet 34, and a pointer 38 disposed in the housing 31 in front of the indicating panel 32 and operatively associated with the pressure converting unit 36. As shown in FIGS. 2 and 3, a stem body 37 interconnects the inlet 34 and the pressure converting unit 36, and is provided with a safety relief valve 33 and a fluid output port 35. The safety relief valve 33 is similar to that disclosed in U.S. Pat. No. 5,131,275 and will not be detailed herein.

The pressure converting unit 36 includes a flexible pressure tube 361 fluidly connected to the inlet 34 via the stem body 37, a pivot arm mechanism 362 coupled to one end of the pressure tube 361, a rotary shaft 365 which is coupled to the pivot arm mechanism 362 and which extends through the indicating panel 32, and an electrically conductive support plate 363 mounted on the stem body 37 for supporting the pivot arm mechanism 362 thereon. The pointer 38 is provided with a downward extension 381 and has a pivot end 382 mounted securely on the rotary shaft 365. The flexible pressure tube 361 expands in response to the pressure imposed on the inlet 34, thereby resulting in corresponding movement of the pivot arm mechanism 362. When the pivot arm mechanism 362 moves due to expansion of the flexible pressure tube 361, the rotary shaft 365 rotates so as to rotate the pointer 38 therewith relative to the indicating panel 32 in order to indicate the pressure on the indicating panel 32.

The pressure indicating unit 30 further includes an electrically conductive pressure control needle 39 which is disposed between the pointer 38 and the indicating panel 32. The pressure control needle 39 has one end formed with a sleeve 391 which permits the rotary shaft 365 to extend therethrough. It should be noted that the rotary shaft 365 rotatably drives the pointer 38 but does not rotate the pressure control needle 39. A restoring spring 392, such as a spiral spring, has a first end coupled to a post 432 located on the support plate 363, and a second end coupled to the sleeve 391 of the pressure control needle 39. The downward extension 381 is disposed on one side of the pressure control needle 39 so that the pointer 38 is capable of moving the pressure control needle 39 therewith relative to the indicating panel 32 against the action of the restoring spring 392 when the measured pressure value increases. When the measured pressure value decreases, the restoring spring 392 unwinds to result in movement of the pressure control needle 39 with the pointer 38 toward the lower pressure values on the indicating panel 32.

The adjustable pressure-setting mechanism 40 includes a rotary plate 41, an electrically conductive low-pressure stop unit 44, an electrically conductive high-pressure stop unit 46 and a drive shaft 47.

The rotary plate 41 is formed with a central hole 410 for passing therethrough the rotary shaft 365 and the sleeve 391 of the pressure control needle 39. The rotary plate 41 is further formed with a curved mounting slot 43 around the central hole 410 and a setting hole unit 42, such as a curved slot, around the mounting slot 43. The rotary plate 41 further has a peripheral edge 411, at least a portion of which is formed with teeth. In this embodiment, the entire peripheral edge 411 of the rotary plate 41 is toothed. The posts 432 on the support plate 363 extend through the mounting slot 43, and screws 431 engage the posts 432 to retain the rotary plate 41 rotatably in the central opening 321 of the indicating panel 32. Since the mounting slot 43 is curved, the posts 432 do not hinder rotation of the rotary plate 41.

Each of the low-pressure and high-pressure stop units 44, 46 is constituted by a screw which extends through the setting hole unit 42 and which engages a nut. The low-pressure and high pressure stop units 44, 46 limit movement of the pressure control needle 39 therebetween. However, since the stop units 44, 46 are disposed below the pointer 38, the stop units 44, 46 do not hinder movement of the pointer 38. The positions of the stop units 44, 46 in the setting hole unit 42 correspond to lower and upper limits of a desired pressure range and can be adjusted by operating the stop units 44, 46. Alternatively, the rotary plate 41 can be rotated to adjust the positions of the stop units 44, 46 in the setting hole unit 42, as will be described in greater detail in the succeeding paragraphs.

The drive shaft 47 is rotatably mounted on the support plate 363 and is provided with a gear 471 which meshes with the teeth on the peripheral edge 411 of the rotary plate 41. The drive shaft 47 has one end which extends out of the housing 31 to permit manual operation of the drive shaft 47 in order to rotate the rotary plate 41.

The signal transmitting unit 50 includes an input voltage cable 53, a low-pressure output signal cable 51 and a high-pressure output signal cable 52. The low-pressure and high-pressure output signal cables 51, 52 are coupled electrically and respectively to the low-pressure and high pressure stop units 44, 46. The input voltage cable 53 is electrically coupled to the support plate 363. Since the sleeve 391 of the pressure control needle 39 is in contact with the support plate 363, and since the support plate 363 and the pressure control needle 39 are both made of an electrically conductive material, the electrical signal present at the input voltage cable 53 can be transmitted to the pressure control needle 39. In order to prevent the electrical signal at the input voltage cable 53 from being transmitted to other parts of the pressure indicating unit 30, an insulating plate 364 is disposed beneath the support plate 363, and the screws 431, the rotary plate 41 and the rotary shaft 365 are made of an insulator material.

When the measured pressure value is between the upper and lower limits of the desired pressure range, no electrical signal is present at the output signal cables 51, 52 since the pressure control needle 39 is disposed between the low-pressure and high-pressure stop units 44, 46 and is not in contact with either of the same. When the measured pressure value corresponds to one of the upper and lower limits of the desired pressure range, the pressure control needle 39 is in electrical contact with the low-pressure or high-pressure stop unit 44, 46 so that the electrical signal present at the pressure control needle 39 can be transmitted to one of the output signal cables 51, 52 via the low-pressure or high-pressure stop unit 44, 46.

In use, the stop units 44, 46 are operated so as to adjust the respective positions of the same in the setting hole unit 42 of the rotary plate 41 in order to set a desired pressure range, e.g. a lower limit (such as 40 psi) and an upper limit (such as 50 psi). Initially, when the measured pressure value is 10 psi, the pressure control needle 39 abuts against the low-pressure stop unit 44 and is retained in a 40 psi position. When power is supplied to a fluid pump (not shown) so as to activate the same, the measured pressure value increases and eventually reaches the lower limit of the desired pressure range. At this time, the downward extension 381 on the pointer 38 abuts against the pressure control needle 39 and causes the pressure control needle 39 to move with the pointer 38 away from the stop unit 44. When the measured pressure value reaches the upper limit of the desired pressure range, the pressure control needle 39 abuts against the high-pressure stop unit 46 so as to generate an electrical signal at the high-pressure output signal cable 52. The electrical signal at the output signal cable 52 can be used to deactivate the fluid pump at this time.

Due to deactivation of the fluid pump, when the measured pressure value starts to drop below the upper limit of the desired pressure range, the pointer 38 begins to move away from the high-pressure stop unit 46 and toward the low-pressure stop unit 44. Since the downward extension 381 of the pointer 38 is disposed on only one side of the pressure control needle 39, the pointer 38 is incapable of moving the pressure control needle 39 therewith from the high-pressure stop unit 46 to the low-pressure stop unit 44. The restoring spring 392 is wound when the pressure control needle 39 moves from the low-pressure stop unit 44 to the high-pressure stop unit 46. Therefore, when the measured pressure value drops below the upper limit of the desired pressure range, the restoring spring 392 unwinds so as to result in movement of the pressure control needle 39 together with the pointer 38 toward the low-pressure stop unit 44.

When the measured pressure value reaches the lower limit of the desired pressure range, the pressure control needle 39 abuts against the low-pressure stop unit 44 so as to generate an electrical signal at the low-pressure output signal cable 51. The electrical signal at the low-pressure output signal cable 51 can be used to control activation of the fluid pump in order to maintain the pressure within the desired pressure range of 40 psi and 50 psi.

To adjust the pressure range from 40–50 psi to 45–55 psi, wherein the difference (10 psi) between the new upper and lower pressure limits is the same as that between the old upper and lower pressure limits, the drive shaft 47 can be simply operated to rotate the rotary plate 41.

It has thus been shown that, aside from simplifying the structure of the conventional pressure gauge described beforehand, the present invention facilitates adjustment of the desired pressure range when the difference between the new upper and lower pressure limits is the same as that between the old upper and lower pressure limits. The object of the present invention is thus met.

The present invention should not be limited to the embodiment described beforehand. For example, the specific configuration of the pressure converting unit 36 may be varied as long as the rotary shaft 365 rotates in response to an incoming pressure. Moreover, the structures of the low-pressure and high-pressure stop units 44, 46 can also be varied as long as they are movable relative to the rotary plate 41, and can be releasably secured to the same. In addition, instead of the curved slot, the setting hole unit 42 in the rotary plate 41 may be formed with a series of equally spaced holes, for such as every 2 psi, that are arranged along a curved line and that permit the low-pressure and high-pressure stop units 44, 46 to pass therethrough. Furthermore, it is not necessary to provide the indicating panel 32 with the central opening 321 since the rotary plate 41 can be disposed above the indicating panel 32.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A signal generating pressure gauge, comprising:

a pressure indicating unit including: a housing provided with an inlet to be connected to an article whose pressure value is to be measured; a pressure-value indicating panel disposed in said housing; a pressure converting unit disposed in said housing behind said indicating panel and fluidly communicated with said inlet, said pressure converting unit having a rotary shaft which extends through said indicating panel and which rotates in response to pressure entering into said inlet; a pointer disposed in said housing in front of said indicating panel and having one end secured to said rotary shaft so as to be rotatable therewith in order to indicate on said indicating panel the pressure imposed on said inlet; and an electrically conductive pressure control needle disposed between said pointer and said indicating panel and having one end rotatably sleeved on said rotary shaft, said pressure control needle being movable together with said pointer;

an adjustable pressure-setting mechanism including: a rotary plate rotatably mounted in said housing and rotatable relative to said indicating panel, said rotary plate being formed with a setting hole unit; and electrically conductive low-pressure and high-pressure stop units extending into said setting hole unit, positions of said low-pressure and high-pressure stop units in said setting hole unit being adjustable and corresponding to lower and upper limits of a desired pressure range, said stop units limiting movement of said pressure control needle therebetween; and a signal transmitting unit including: an input voltage cable electrically coupled to said pressure control needle for providing an electrical signal thereto; a low-pressure output signal cable electrically coupled to said low-pressure stop unit; and a high-pressure output signal cable electrically coupled to said high-pressure stop unit;

whereby, said pressure control needle electrically contacts said high-pressure stop unit to transmit the electrical signal to said high-pressure output signal cable when the pressure entering into said inlet reaches the upper limit of the desired pressure range, and electrically contacts said low-pressure stop unit to transmit the electrical signal to said low-pressure output signal cable when the pressure entering into said inlet reaches the lower limit of the desired pressure range.

2. The signal generating pressure gauge as claimed in claim 1, wherein said pointer is formed with a downward extension for moving said pressure control needle therewith from said low-pressure stop unit to said high-pressure stop unit, said pressure indicating unit further including a restoring spring with a first end connected to said housing and a second end connected to said pressure control needle, said restoring spring being wound when said pressure control needle moves with said pointer from said low-pressure stop unit to said high-pressure stop unit, and unwinding to bias said pressure control needle toward said downward extension of said pointer when said pointer moves from said high-pressure stop unit to said low-pressure stop unit.

3. The signal generating pressure gauge as claimed in claim 1, wherein said rotary plate has a peripheral edge, at least a portion of which is formed with teeth, said pressure indicating unit further including a drive shaft rotatably mounted to said housing and provided with a gear which meshes with said peripheral edge of said rotary plate, said drive shaft having one end which extends out of said housing to permit manual operation of said drive shaft in order to rotate said rotary plate.

4. The signal generating pressure gauge as claimed in claim 1, wherein said setting hole unit is formed as a curved slot.

5. The signal generating pressure gauge as claimed in claim 1, wherein said rotary plate is further formed with a curved mounting slot, said pressure-setting mechanism further including at least one screw which extends through said mounting slot for rotatably mounting said rotary plate to said housing.

6. The signal generating pressure gauge as claimed in claim 1, wherein said pressure indicating unit further includes a stem body which interconnects said inlet and said pressure converting unit and which is provided with a safety relief valve.

* * * * *